United States Patent
Totsu et al.

(10) Patent No.: US 7,102,265 B2
(45) Date of Patent: Sep. 5, 2006

(54) FOUR-POLE SYNCHRONOUS MOTOR

(76) Inventors: Katsuyuki Totsu, 32-13, Oshiage 1-chome, Sumida-ku, Tokyo (JP) 131-0045; Fumito Komatsu, 1632-12, Hirookanomura, Shiojiri-shi, Nagano (JP) 399-0702

( * ) Notice: Subject to any disclaimer, the term of this patent is extended or adjusted under 35 U.S.C. 154(b) by 0 days.

(21) Appl. No.: 10/520,154

(22) PCT Filed: Jun. 2, 2003

(86) PCT No.: PCT/JP03/06973

§ 371 (c)(1),
(2), (4) Date: Jan. 3, 2005

(87) PCT Pub. No.: WO2004/006414

PCT Pub. Date: Jan. 15, 2004

(65) Prior Publication Data

US 2006/0033400 A1    Feb. 16, 2006

(30) Foreign Application Priority Data

Jul. 2, 2002    (JP)    ............................. 2002-193343

(51) Int. Cl.
*H02K 1/14*    (2006.01)
*H02K 21/22*    (2006.01)
*H02K 19/02*    (2006.01)

(52) U.S. Cl. ...................... 310/216; 310/162; 310/194; 310/261

(58) Field of Classification Search ................ 310/216, 310/218, 254, 194, 162, 165
See application file for complete search history.

(56) References Cited

U.S. PATENT DOCUMENTS

| | | | | |
|---|---|---|---|---|
| 4,365,187 A | * | 12/1982 | McDaniel et al. | .......... 318/254 |
| 4,730,136 A | * | 3/1988 | Muller | ...................... 310/68 R |
| 4,899,075 A | * | 2/1990 | Hasebe | ........................ 310/257 |
| 5,962,938 A | * | 10/1999 | Bobay et al. | ............. 310/67 R |
| 5,982,055 A | * | 11/1999 | Matsushita et al. | ... 310/40 MM |
| 6,137,202 A | * | 10/2000 | Holmes et al. | ............. 310/180 |
| 6,329,736 B1 | * | 12/2001 | Bernauer et al. | ........... 310/254 |

FOREIGN PATENT DOCUMENTS

| | | |
|---|---|---|
| JP | 58-26561 | 2/1983 |
| JP | 9-84316 | 3/1997 |
| JP | 9-135559 | 5/1997 |
| JP | 10-201187 | 7/1998 |
| JP | 2000-125580 | 4/2000 |
| JP | 2000-166287 | 6/2000 |
| JP | 2001-61240 | 3/2001 |
| JP | 2002/112513 | 4/2002 |

* cited by examiner

*Primary Examiner*—Tran Nguyen
(74) *Attorney, Agent, or Firm*—Jordan and Hamburg LLP

(57) ABSTRACT

The four-pole synchronous motor comprises a stator core having first magnetic pole cores formed at both ends of a connection body part of crisscrossed connection body parts and second magnetic pole cores formed at both ends of the connection body part. The first magnetic pole cores include magnetic flux acting surface parts extended toward both sides thereof in a circumferential direction. A shape of each magnetic flux acting surface part on one side of a longitudinal centerline of the first magnetic pole cores is different from that on the other side so as to be magnetically asymmetrical with respect to the longitudinal centerline.

10 Claims, 10 Drawing Sheets

FIG.1A
FIG.1B
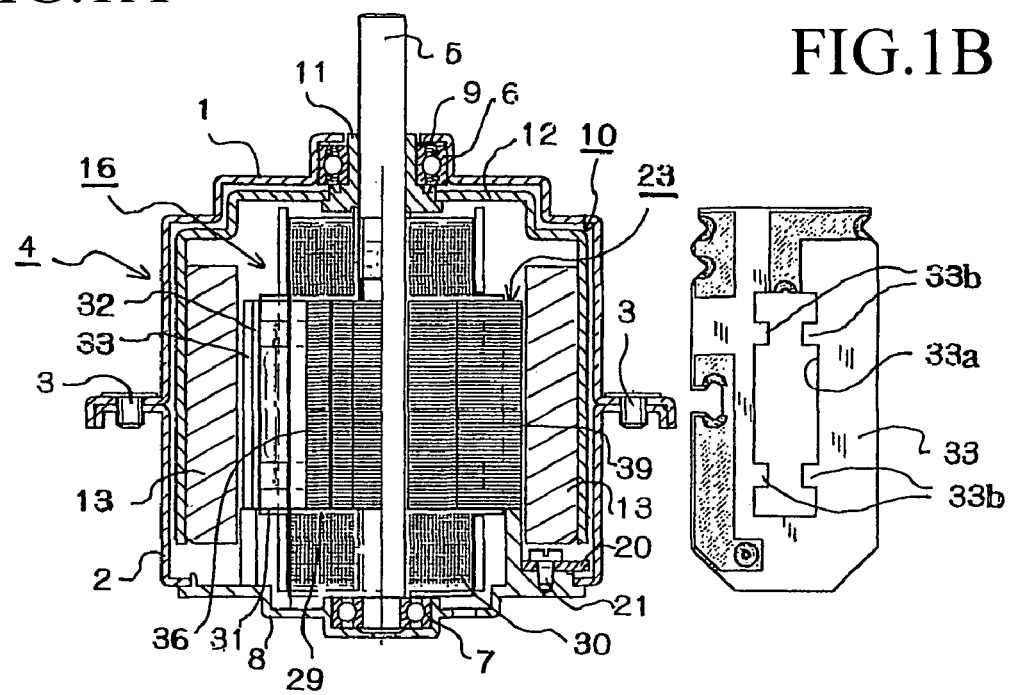
FIG.2A
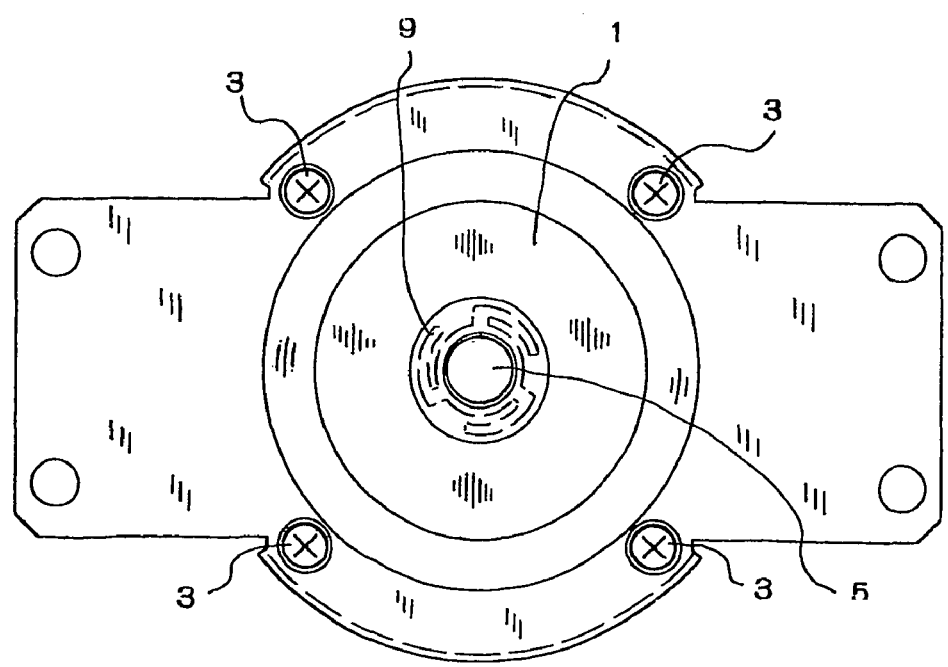

FIG.3
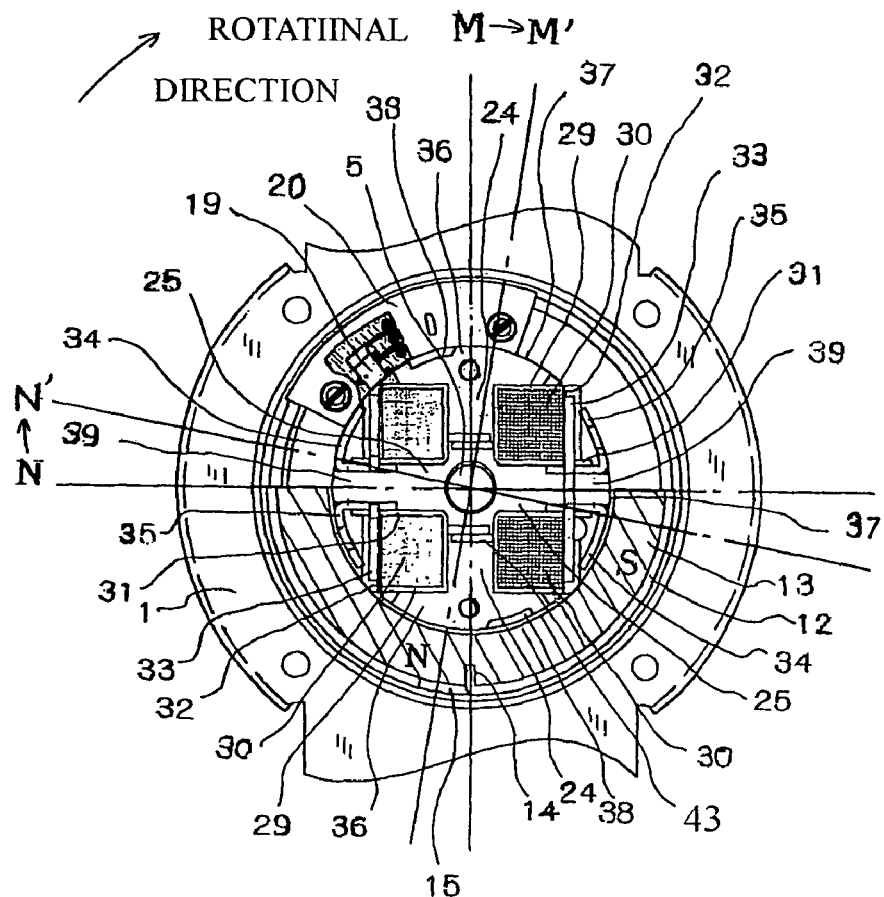
FIG.8A
FIG.8B
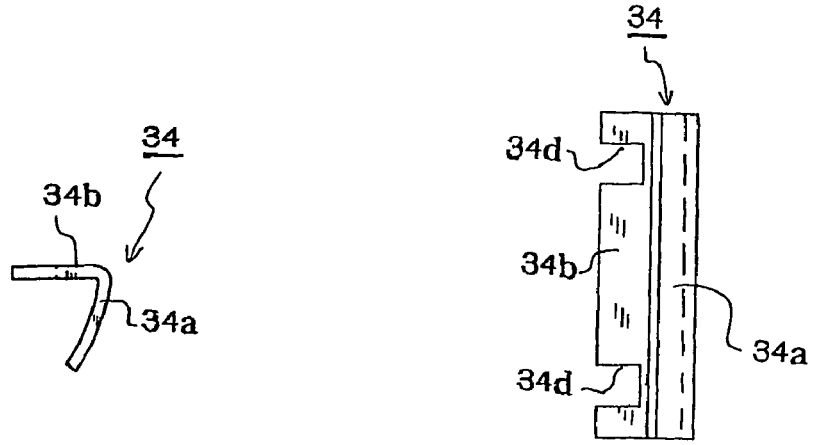

FIG.4A 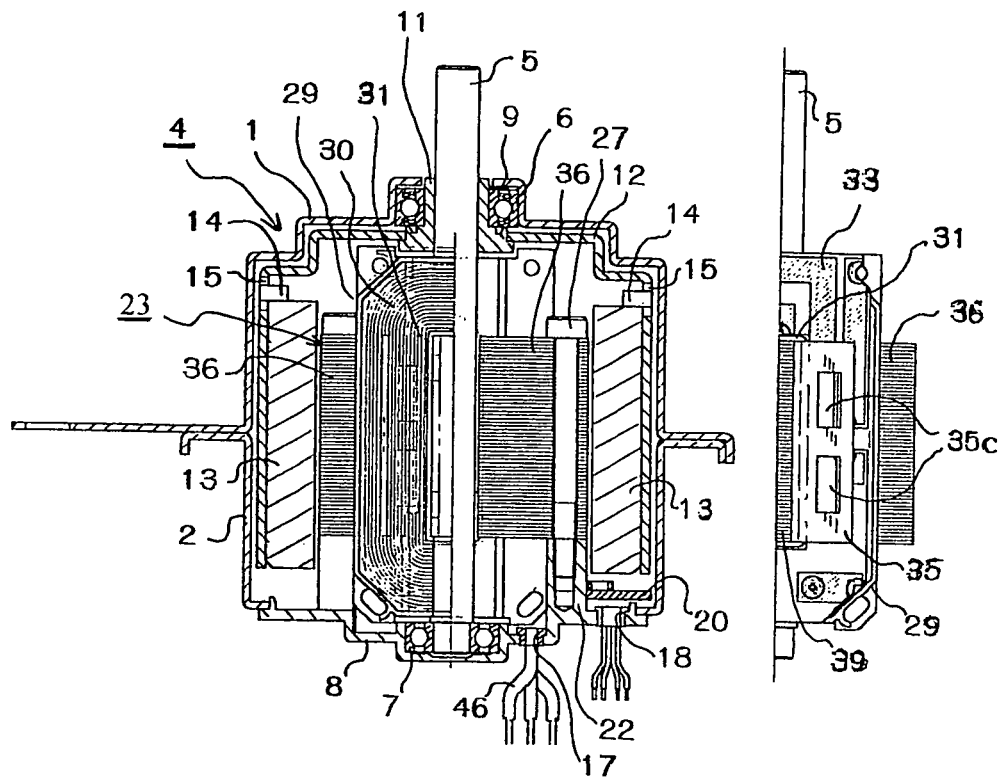 FIG.4B
FIG.5
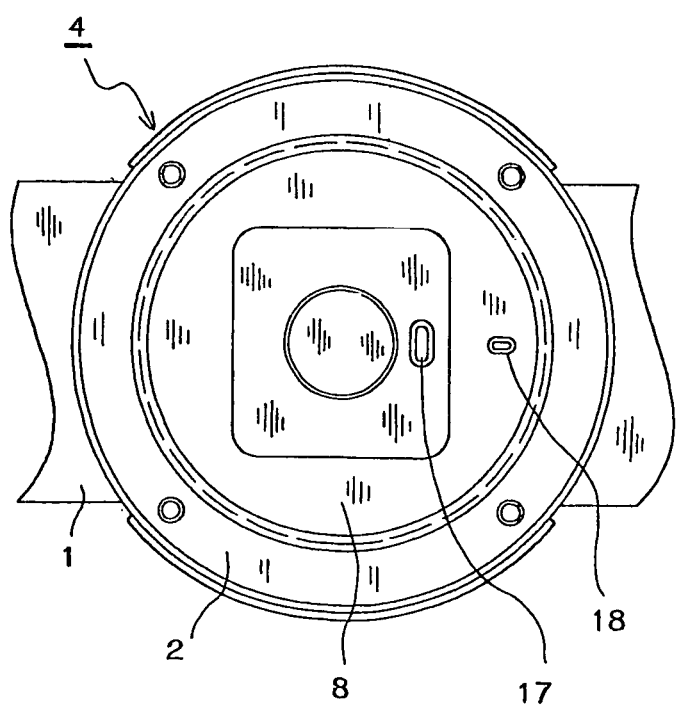

C-C

A-A

B-B

FOUR-POLE SYNCHRONOUS MOTOR

FIELD OF TECHNOLOGY

The present invention relates to a four-pole synchronous motor.

BACKGROUND TECHNOLOGY

These days, DC or AC fan motors for cooling are equipped with office automation apparatuses, especially four-pole AC fan motors are suitably used at high rotational speed.

The AC fan motor is a synchronous motor comprising armature coils, a rectifying circuit including diodes, brushes and a commutator, an AC current is rectified so as to rotate a magnet rotor as a DC motor until a rotational speed of the magnet rotor reaches a synchronous speed, then the commutator is mechanically disconnected from the rectifying circuit so as to perform synchronous operation driven by an AC power (see Japanese Patent Gazettes No. 9-84316 and 9-135559).

Further, another synchronous motor has a microcomputer controlling power distribution, directions of a rectified current running through A-coils and B-coils of a starting circuit is alternately changed to start the motor, or a rectified current alternately running through armature coils is switched while the current is inverted so as to start the motor with restraining the current on the inverting side, and an operation switch turns on a synchronous drive circuit to perform synchronous operation when a rotational speed of a magnet rotor, which is detected by a photo sensor, reaches a synchronous speed (see Japanese Patent Gazettes No. 2000-125580 and 2000-166287).

In the above described synchronous motors, bobbins made of insulating resin are fitted in groove sections of stator cores (layered cores), and a wire is wound on the bobbins as armature coils. The wire is wound on the bobbins, by an automatic winder, and their winding numbers and winding directions are based on rotational directions of the motors.

In the above described synchronous motors, the rotational directions of the magnet rotors are not stable when the motors are started, and magnetic poles of the rotors and the stators mutually draw when the currents run through the coils, so that the motors have rotational dead points, at which the magnet rotors is stopped.

It is difficult to automate the steps of fitting the bobbins to the stator core and winding the wire on the bobbins, so that the steps of manufacturing the motor must be increased and efficiency of manufacturing the motor must be lower.

When the wire is wound on the bobbins, it is difficult to regular-wind the coils due to flexure and deformation of the bobbins. Therefore, space factor of the coils must be lower, and motor efficiency must be lower, too. Further, off-coil wires must be wired in narrow spaces encased by the magnet rotors, so it is difficult to wire the off-coil wires without interfering with the magnet rotors, and reliability of connecting sections of external wires must be lowered by tensile force, heat generated in the coils, etc.

DISCLOSURE OF THE INVENTION

A first object of the present invention is to provide a four-pole synchronous motor capable of stabilizing a starting direction of a magnet rotor, a second object is to simplify manufacturing steps of the motor and improve manufacturing efficiency of the same, a third object is to improve space factor of armature coils, which are wound on a stator core with bobbins, and a fourth object is to shorten wire length of off-coil wires and improve reliability of connecting sections.

To achieve the objects, the present invention has following structures.

Namely, the four-pole synchronous motor comprises: a cylindrical magnet rotor having four magnetic poles, the magnet rotor being supported in a housing and capable of rotating about an axis of an output shaft; and a stator, through which the output shaft is pierced, being provided in a space encased by the magnet rotor, the stator having a stator core, on which armature coils are formed with bobbins, wherein the stator core has first magnetic pole cores formed at both ends of a connection body part of crisscrossed connection body parts and second magnetic pole cores formed at both ends of the connection body part, the first magnetic pole cores include magnetic flux acting surface parts extended toward both sides thereof in a circumferential direction, and a shape of each magnetic flux acting surface part on one side of a longitudinal centerline of the first magnetic pole cores is different from that on the other side so as to be magnetically asymmetrical with respect to the longitudinal centerline.

For example, auxiliary cores are provided to both sides of the second magnetic pole cores so as to extend magnetic flux acting surface parts thereof toward both sides in the circumferential direction, and the auxiliary cores are held between the second magnetic pole cores and the bobbins. In this case, pole piece sections are provided to both sides of the second magnetic pole cores as auxiliary cores so as to extend magnetic flux acting surface parts thereof toward both sides in the circumferential direction, and a shape of each pole piece section on one side of a longitudinal centerline of the second magnetic pole cores is different from that on the other side so as to be magnetically asymmetrical with respect to the longitudinal centerline.

The magnetic flux acting surface parts of the first magnetic pole cores and the second magnetic pole cores, which face the magnet rotor, are formed in the circumferential direction within central angles of 50–70 degrees.

Further, in another motor, the bobbins have groove sections, each of which is formed into a U-shape by a cylindrical core section, a wall section enclosing the cylindrical core section and a bridging section connecting the both, the ring-shaped armature coils are fitted in the groove sections, and the second magnetic pole cores are pierced through the cylindrical core sections until the bridging sections contact side faces of the connection body part of the first magnetic pole cores, thereby the bobbins are fitted in the stator core. In this motor, the ring-shaped armature coils, which are wound by a winding jig, are fitted in the groove sections of the bobbins. And, the armature coils are formed by winding a self-welding wire, fitted in the groove sections of the bobbins and adhered therein.

Further, the cylindrical core sections are outwardly projected from the wall sections, insulator films covering side faces of the armature coils fitted in the cylindrical core sections are fitted to the cylindrical core sections, and connection boards, in which cable patterns for mutually connecting electrodes of the armature coils are formed, are provided on the outer side of the insulator films and fitted to the cylindrical core sections. In this case, the bobbins have first wiring holes, through which off-connection wires, which mutually connect connection boards in which cable patterns for mutually connecting electrodes of the armature coils are formed, are pierced, and second wiring holes, through which external wires, which are connected to the connection boards, are bundled and pierced.

In the four-pole synchronous motor of the present invention, the shape of each pole piece section on one side of the longitudinal centerline of the second magnetic pole cores is different from that on the other side so as to be magnetically asymmetrical with respect to the longitudinal centerline, so rotational dead points of the magnet rotor can be disappeared and the starting direction of the magnet rotor can be stabilized.

Preferably, the shape of each pole piece section, which act as the auxiliary core, on one side of the longitudinal centerline of the second magnetic pole cores is different from that on the other side so as to be magnetically asymmetrical with respect to the longitudinal centerline, so that the starting direction of the magnet rotor can be stabilized.

The bobbins have groove sections, each of which is formed into the U-shape by the cylindrical core section, the wall section enclosing the cylindrical core section and the bridging section connecting the both, the ring-shaped armature coils are fitted in the groove sections, and the second magnetic pole cores are pierced through the cylindrical core sections until the bridging sections contact side faces of the connection body part of the first magnetic pole cores, thereby the bobbins are fitted in the stator core; therefore manufacturing steps of the motor can be simplified and automated so that manufacturing efficiency can be improved.

Since the ring-shaped armature coils, which have been wound by the winding jig, are fitted in the groove sections of the bobbins, the armature coils can be regular-wound without reference to flexure and deformation of the bobbins. Therefore, space factor of the coils can be improved, and motor efficiency can be improved, too.

The connection boards, in which the cable patterns for mutually connecting the electrodes of the armature coils are formed, are fitted to the cylindrical core sections, so that the armature coils can be connected by the connection boards in spaces on the outer sides of the armature coils, wire length in the motor can be shortened and the motor can be small in size.

Further, the bobbins have first wiring holes, through which the off-connection wires mutually connecting the connection boards are pierced, so that the connection boards can be connected via the shortest way; the bobbins have second wiring holes, through which external wires being connected to the connection boards are bundled and pierced, so that tensile forces working to external wires can be once received by the bobbins having the second wiring holes, no tensile forces directly work to the connecting sections of the connection boards and reliability of the connecting sections can be improved.

BRIEF DESCRIPTION OF THE DRAWINGS

FIG. 1A is a sectional view of a four-pole synchronous motor seen from a first magnetic pole core side; FIG. 1B is an explanation view of a connection board;

FIG. 2 is a plan view of the motor showing an upper housing;

FIG. 3 is a plan view of the motor, from which the upper housing is partially removed;

FIG. 4A is a sectional view of the four-pole synchronous motor, from which the connection boards and insulator films are removed; FIG. 4B is a partial view showing an auxiliary core attached;

FIG. 5 is a bottom view of the motor showing a lower housing;

FIG. 8A is a plan view of the auxiliary core; FIG. 8B is a front view thereof;

PREFERRED EMBODIMENTS OF THE INVENTION

Figure 6:
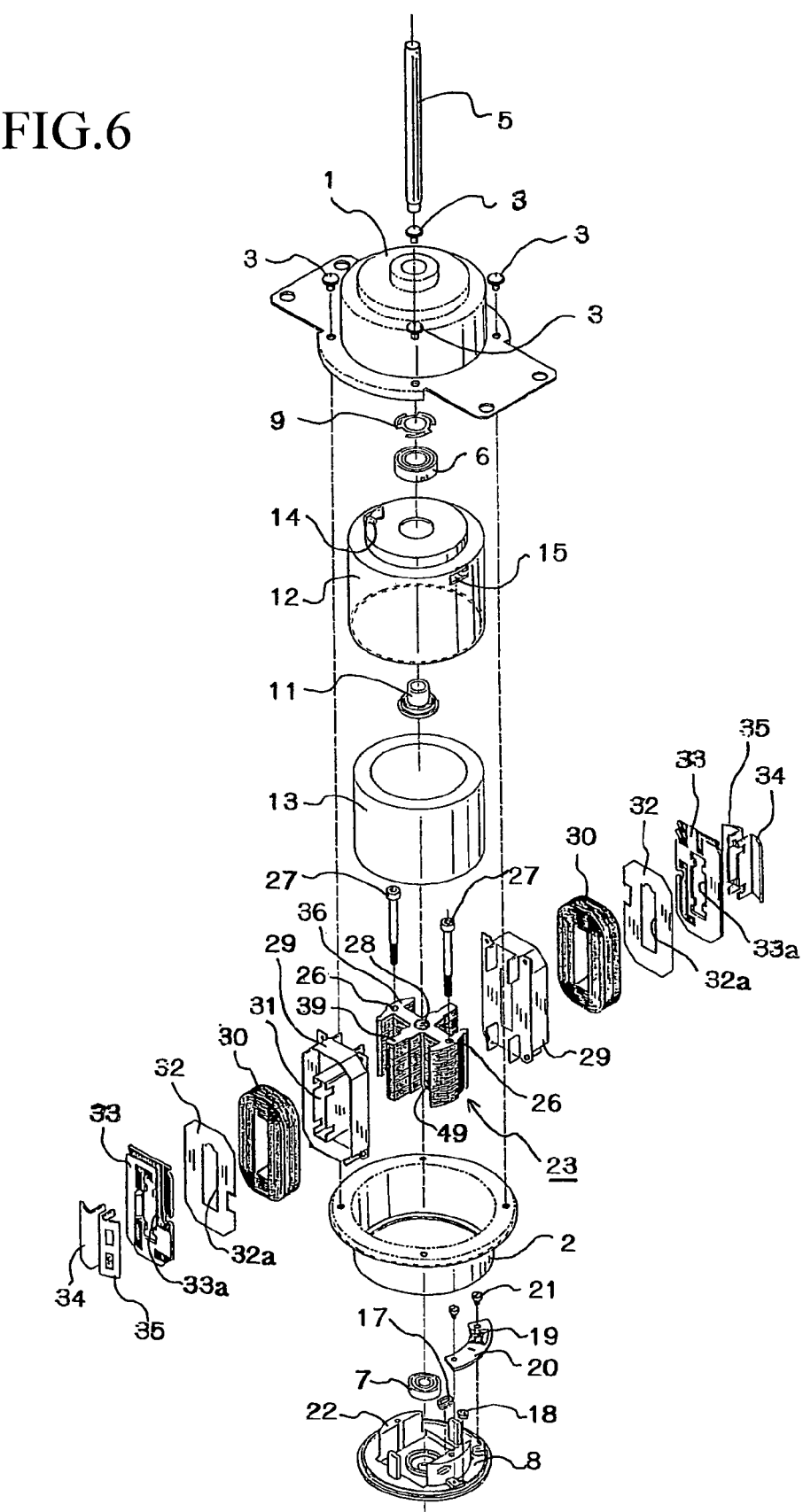
FIG. 6 is an exploded perspective view of the four-pole synchronous motor.

Firstly, an overall structure of a four-pole synchronous motor will be explained with reference to FIGS. 1–6.

In the following description, the synchronous motor is an outer rotor type four-pole synchronous motor.

In FIGS. 1–3, a rotating member (a rotor) and a fixed member (a stator) is accommodated in a housing 4, which is constituted by an upper housing 1 and a lower housing 2, which are piled and coupled by screws 3. In FIG. 1A, an output shaft 5 is attached to the housing 4. The output shaft 5 is supported by an upper bearing 6, which is held by the upper housing 6, and a lower bearing 7, which is fitted in a stator frame 8 fixed to the lower housing by caulking. The upper bearing 6 and the lower bearing 7 are made of a nonmagnetic material, e.g., stainless steel, so as not to disturb magnetic fields generated by armature coils. A spring 9 is provided between an upper end of the upper bearing 6 in an axial direction and the upper housing 1 so as to downwardly bias the upper bearing 6 in the axial direction and prevent flotation of the rotor.

The magnet rotor 10 will be explained with reference to FIGS. 4–6. A boss 11 is fixed to a rotor case 12 by caulking, and the rotor case 12 is fitted to the output shaft 5 by the boss 11 and fixed thereto. The boss 11 is rotatably supported by the upper bearing 6, which is provided to the upper housing 1. The rotor case 12 is formed into a cup-shape, whose lower face is opened, and a cylindrical permanent magnet 13 is fixed on an inner circumferential face. Four magnetic poles N and S of the permanent magnet 13 are alternately magnetized in a circumferential direction with angular separations of 90 degrees. The permanent magnet 13 may be made of, for example, ferrite, rubber, plastic, samarium cobalt, rare earth metal, neodymium-iron-boron, etc. at low cost. Two bent pieces 14 and notches 15 are formed in an outer circumferential face of the rotor case 12 by inwardly bending the pieces, which have been partially cut in the circumferential direction. The bent pieces 14 are used as positioning means (stoppers) for correctly attaching the permanent magnet 13 in the rotor case 12 (see FIG. 4A), and the notches 15 act as ventilation holes for diffusing heat generated by the stator 16. As described above, the boss 12 is attached to the output shaft 5, so that the magnet rotor 10 is rotatably supported by the housing 4. When an electric power is applied, the magnet rotor 10 is started to rotate about an axis of the output shaft 5 by repulsion to the magnetic poles of the stator 16.

The stator 16 is accommodated in a space encased by the magnet rotor 10. In FIG. 5, a wire outlet 17, form which wires are extended outward, and a wire outlet 18, from which wires to be connected to a sensor for detecting a rotational position of the rotor, are formed in the stator frame 8, which is fixed to the lower housing 2 by caulking. The wires outwardly extended from the wire outlets 17 and 18 are electrically connected to a control board, in which a starting circuit and a synchronizing circuit are formed.

In FIG. 6, the lower bearing 7 is held by the stator frame 8 and rotatably support one end of the output shaft 5. A sensor board 20, on which a Haul element 19 for detecting the magnetic poles and revolution number of the magnet rotor 10 are provided, is fixed to the stator frame 8 by screws 21. The Haul element 19 detects the revolution number of the magnet rotor 10 and positions of the magnetic poles thereof and generates pulses corresponding to the revolution number, so that a microcomputer, described later, switching-controls the starting circuit at prescribed timing according to the positions of the magnetic poles. Note that, a light transmission optical sensor, a light reflection optical sensor, a magnetic sensor including a magnetic resistance element or a coil, high-frequency induction sensor, a capacitance sensor, etc. may be employed instead of the Haul element 19.

The stator 16 will be explained with reference to FIGS. 4 and 6. In FIG. 4A, the stator frame 8 has a mounting section 22, and a stator core 23 is mounted on the mounting section 22. The stator core 23 is a four-slot layered core, and first magnetic pole cores 36 and second magnetic pole cores 39 are respectively formed at ends of crisscrossed connection body parts 24 and 25. The first magnetic pole cores 36 have holes (through-holes) 26 for fixation, and bolts 27 are pierced through the holes 26 so as to fix the stator core 23 to the mounting section 22. A shaft hole (a through-hole) 28 is formed at a crossing section of the crisscrossed connection body parts 24 and 25, and the output shaft 5 is pierced therethrough. Armature coils 30 are fitted to the stator core 23 with bobbins 29.

In FIG. 6, the second magnetic pole cores 39 are inserted into cylindrical core sections 31 until the bobbins 29 contact side faces 49 of the first magnetic pole cores 36 so as to attach them to the stator core 23. The armature coils 30, in which, for example, A-coils and B-coils are serially connected, are fitted to the cylindrical core sections 31 of the bobbins 29. Insulator films 32, which have fitting holes 32a at centers, and connection boards 33, which have fitting holes 33a at centers, are fitted to the cylindrical core sections 31, to which the armature coils 30 will be fitted, in that order. Auxiliary cores 34 and 35 are inserted into the fitting holes 33a and 32a from outside of the connection boards 33 to attach to both sides of the second magnetic pole cores 39, and they are clamped between side faces of the second magnetic pole cores 39 and inner faces of the cylindrical core sections 31 (see FIGS. 3 and 4B).

Figure 7A:
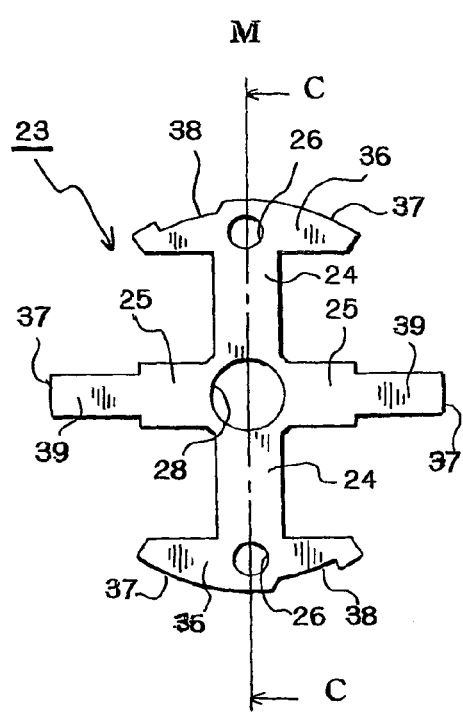
FIG. 7A is a plan view of a stator core.
Figure 7B:
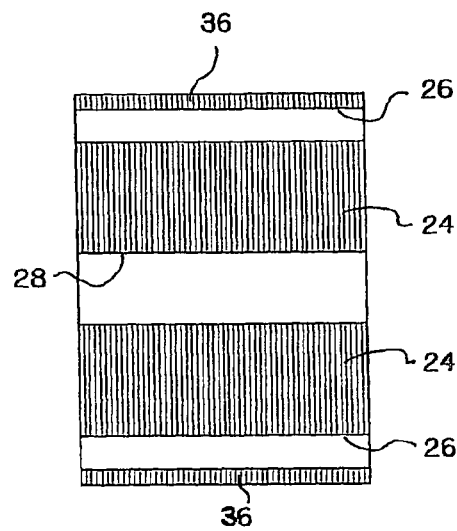
FIG. 7B is a sectional view taken along a line C—C.

Next, the structure of the stator 16 will be explained with reference to FIGS. 3, 7–13, 15 and 16. In FIGS. 7A and 7B, the stator core 23 has magnetic flux acting surface parts 37, which are extended from the first magnetic pole cores 36 toward both sides in the circumferential direction, and a shape of each magnetic flux acting surface part 37 on one side of a longitudinal centerline M of the first magnetic pole cores 36 is different from that on the other side so as to be magnetically asymmetrical with respect to the longitudinal centerline M. For example, concave sections 38 are formed in the magnetic flux acting surface parts 37 of the first magnetic pole cores 36, which face the magnet rotor 10, so that gaps (spaces) are formed with respect to the magnetic poles of the rotor; therefore, magnetic fluxes, which are generated from the magnetic flux acting surface parts 37, on the right side and the left side of the center line M are overbalanced, and the magnetic fluxes are shifted toward low magnetic resistance parts, in which no concave sections 38 are formed, or biased in the clockwise direction. In FIG. 3, the concave sections 38 of the magnetic flux acting surface parts 37 of the first magnetic pole cores 36 are point-symmetrically formed (separated with an angular separation of 180 degrees) with respect to the axis of the output shaft 5. Magnetic permeability of the stator core 23 is greater than that of the auxiliary cores 34 and 35. For example, the stator core 23 is made by piling silicon steel plates.

Figure 9A:
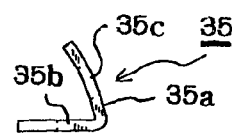
FIG. 9A is a plan view of another auxiliary core.

In FIG. 3, the auxiliary cores 34 and 35, which extend the magnetic flux acting surface parts 37 of the second magnetic pole cores 39, are clamped between the side faces of the second magnetic pole cores 39 and the inner faces of the cylindrical core sections 31. Each auxiliary core 34 is provided to one side face of each second magnetic pole core 39; each auxiliary core 35 is provided to the other side face thereof. The auxiliary cores 34 and 35 are respectively provided to the both side faces of each second magnetic pole core 39 so as to supplement the magnetic fluxes generated from the magnetic flux acting surface part 37. A shape of each pole piece section 34a or 35a of each auxiliary core 34 or 35, which acts as the magnetic flux acting surface part, on one side of a longitudinal centerline N of the second magnetic pole cores 39 is different from that on the other side so as to be magnetically asymmetrical with respect to the longitudinal centerline N. Namely, the pole piece sections 34a of the auxiliary cores 34 are formed into circular arcs as shown in FIGS. 8A and 8B; the pole piece sections 35a of the auxiliary cores 35 are formed into circular arcs having holes 35c as shown in FIGS. 9A–9C.

In FIG. 3, magnetic fluxes, which are generated from the magnetic flux acting surface parts 37 of the second magnetic pole cores 39 including the pole piece sections 34a and 35a, on the right side and the left side of the center line N are overbalanced, and the magnetic fluxes are shifted toward low magnetic resistance parts, in which no holes 35c are formed, or biased toward the auxiliary cores 34 in the clockwise direction. In the present embodiment, the auxiliary cores 34 and 35 are point-symmetrically provided to the second magnetic pole cores 39 (separated with an angular separation of 180 degrees) with respect to an axis of the output shaft 5. The holes 35c of the pole piece sections 35a of the auxiliary cores 35 are also point-symmetrically formed (separated with an angular separation of 180 degrees). For example, the auxiliary cores 34 and 35 are made of cold-rolled steel plates. Note that, the shifting or biasing direction of the magnetic fluxes generated from the second magnetic pole cores 39 including the auxiliary cores 34 and 35 are the same to that of the magnetic fluxes generated from the first magnetic pole cores 36 (e.g., the clockwise direction), but shifting angles (an angle between M–M' and an angle between N–N' shown in FIG. 3) need not be equal.

Figure 9B:
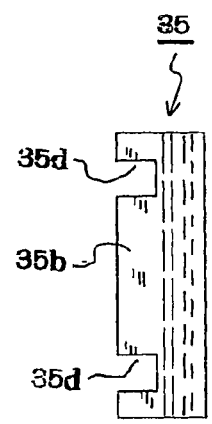
FIG. 9B is a front view thereof.
Figure 9C:
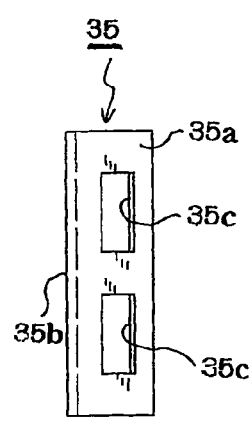
FIG. 9C is a right side view thereof.
Figure 10A:
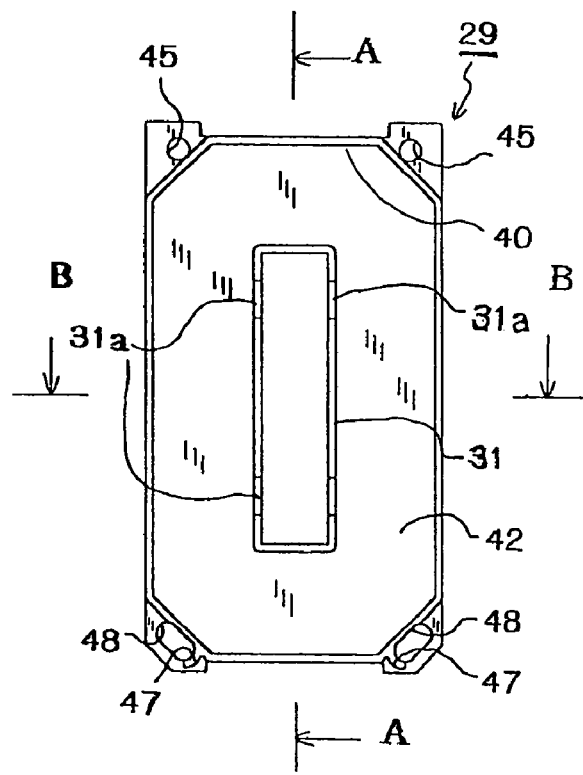
FIG. 10A is a plan view of a bobbin.
Figure 10B:
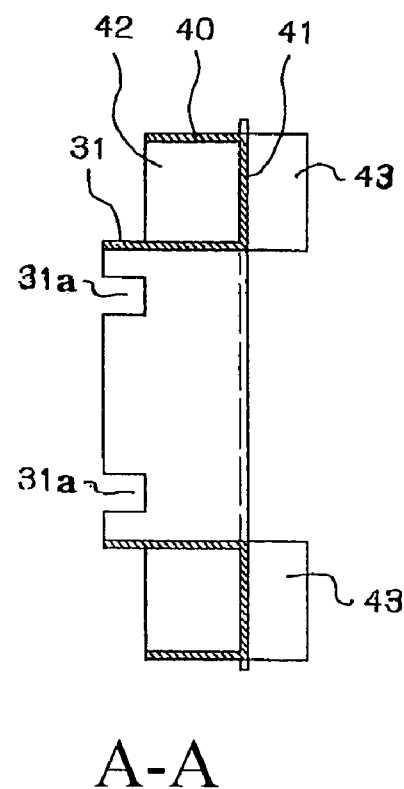
FIG. 10B is a sectional view taken along a line A—A.
Figure 10C:
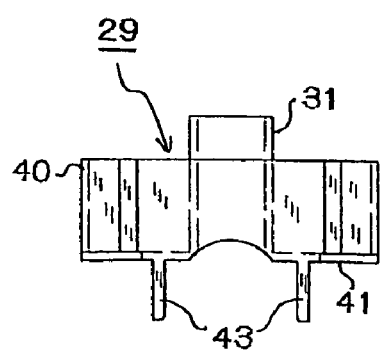
FIG. 10C is a front view of the bobbin.
Figure 10D:
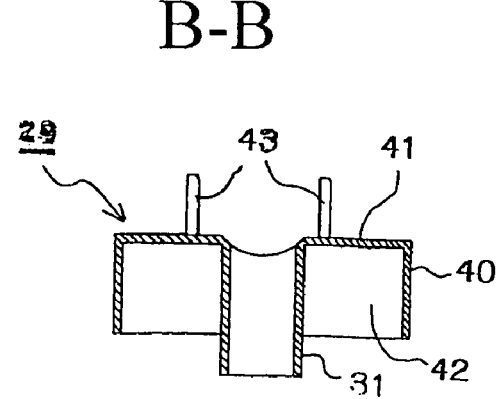
FIG. 10D is a sectional view taken along a line B—B.

As shown in FIGS. 8B and 9B, two notches 34*d* and 35*d* are respectively formed in inserting sections 34*b* and 35*b* of the auxiliary cores 34 and 35. In FIG. 1B, two projected sections 33*b* are projected from each longitudinal edge of the fitting hole 33*a* of the connection board 33. The inserting sections 34*b* and 35*b* of the auxiliary cores 34 and 35 are inserted into the fitting holes 33 of the connection boards 33, and the notches 34*d* and 35*d* are respectively engaged with the projected sections 33*b* so that the auxiliary cores can be attached to the both sides of the second magnetic pole cores 39.

Figure 15:
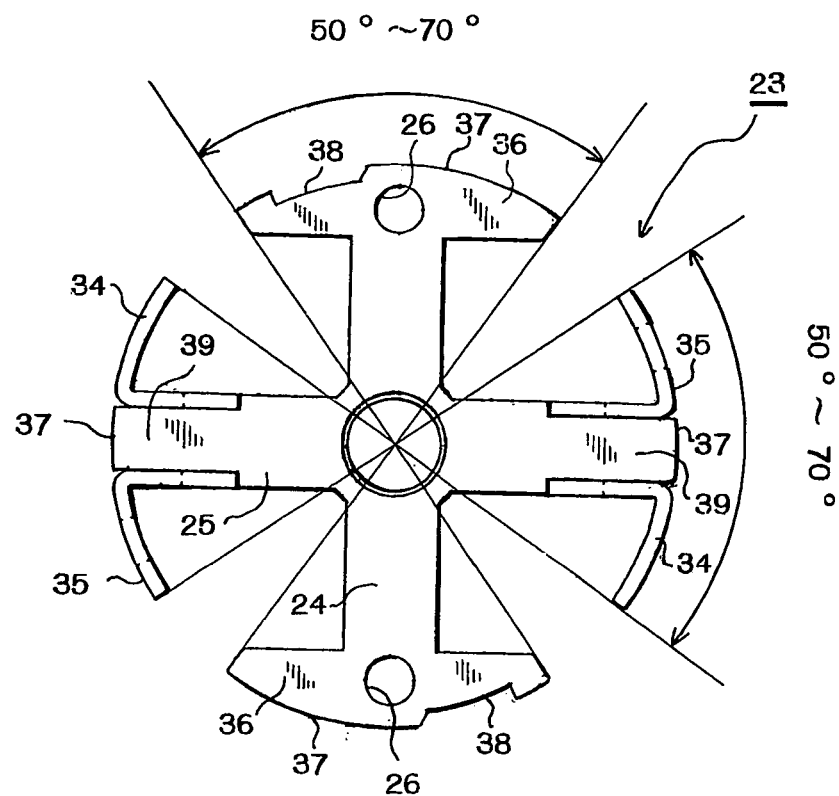
FIG. 15 is an explanation view showing angular range of magnetic flux acting surface parts of first magnetic pole cores and second magnetic pole cores.
Figure 16:
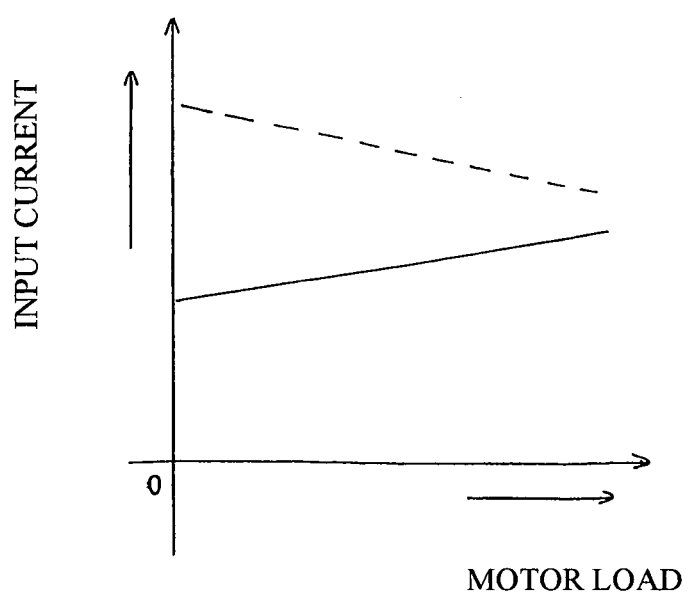
FIG. 16 is a graph showing a relationship between a motor load and an input current.

In FIG. 15, the magnetic flux acting surface parts 37 of the first magnetic pole cores 36, which face the magnet rotor 10, are formed in the circumferential direction within central angles of 50–70 degrees, preferably 57–60 degrees. The magnetic flux acting surface parts 37 of the second magnetic pole cores 39 including the auxiliary cores 34 and 35 are formed in the circumferential direction within central angles of 50–70 degrees, preferably 57–60 degrees.

Four magnetic poles are sinewave-magnetized to the magnet rotor 10, so that the rotation can be maintained, with damping phenomena (phase lags of induced voltage with respect to an input current), on the basis of power factor corresponding to a motor load and an increase of the input current. If the angular ranges of the magnetic flux acting surface parts 37 of the stator core 23, which face the magnet rotor 10, are improper, the input current value with no load is greater than that with loads as indicated by a dotted line of a graph of motor load-input current shown in FIG. 16, so that relative power consumption efficiency must be lowered. On the other hand, by setting the angular ranges of the magnetic flux acting surface parts of the stator core 23, which face the magnet rotor 10, 50–70 degrees, preferably 57–60 degrees, more preferably about 57 degrees, the input current value with no load is smaller than that with loads as indicated by a solid line of the graph shown in FIG. 16, so that the relative power consumption efficiency can be improved.

In FIGS. 10A–10D, the bobbin 29 includes the cylindrical core section 31 and a wall section 40 enclosing the cylindrical core section, which are integrated by a bridging section 41. The armature coil 30, in which a wire has been previously wound, is fitted to a U-shaped groove section 42, which is constituted by the cylindrical core section 31, the wall section 40 and the bridging section 41. Two notches 31*a* are formed in each longitudinal edge of the cylindrical core section 31. When the connection board 33 shown in FIG. 1B is fitted to the cylindrical core section 31, the projected sections 33*b* in the fitting hole 33*a* are engaged with the notches 31*a*. Wall plates 43 are projected outward from the bridging section 41. In FIG. 3, the wall plates 43 clamp the connection body part 24 of the first magnetic pole cores 36 when the bobbins 29 are fitted to the stator core 23, and they enclose the output shaft 5.

Figure 11A:
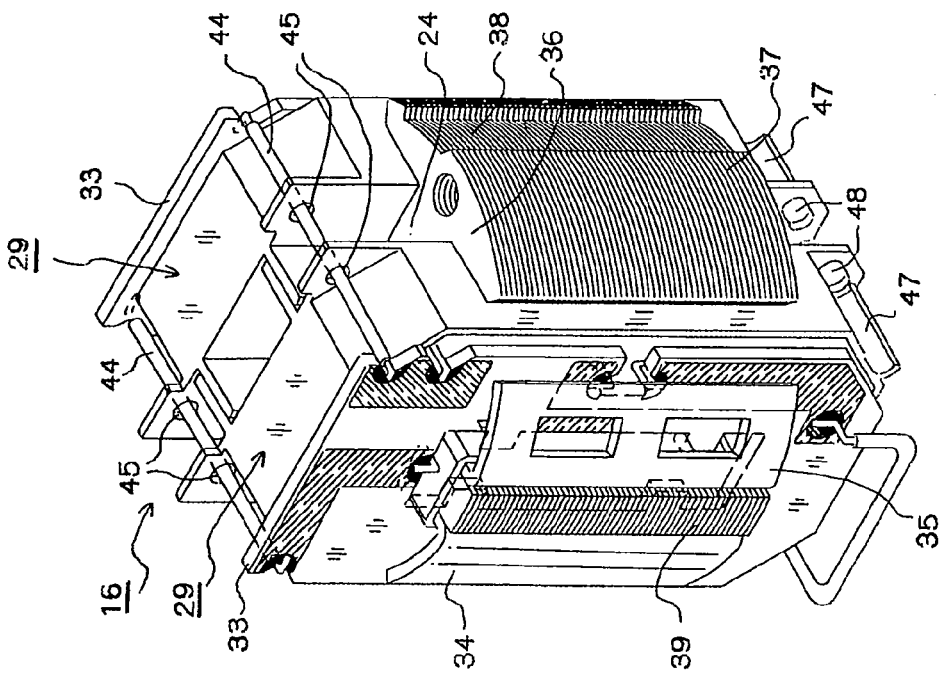
FIGS. 11A and 11B are perspective views of the stator core.
Figure 11B:
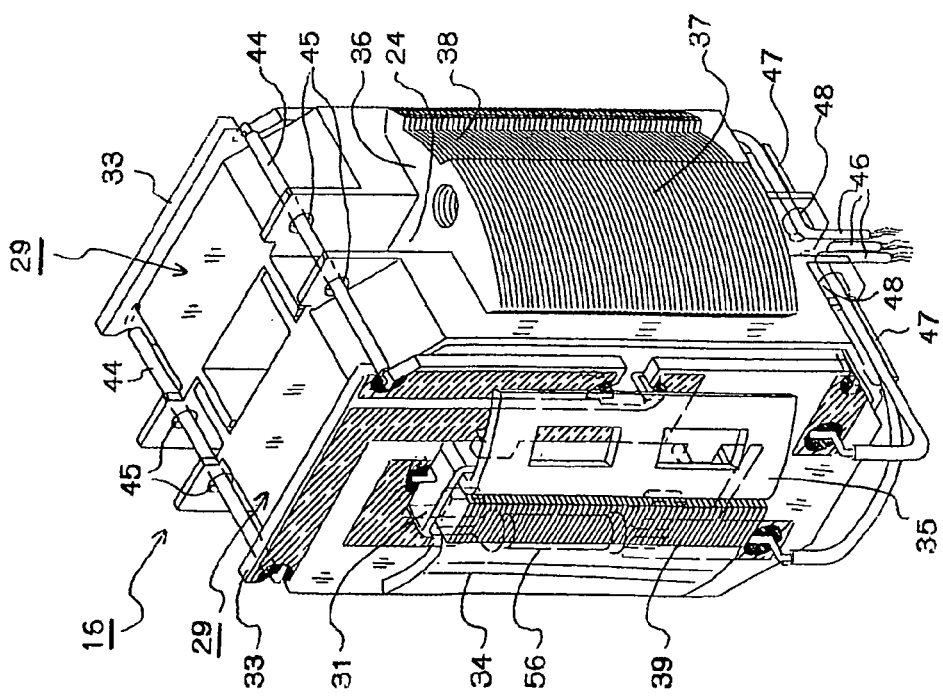

In FIGS. 11A and 11B, the bobbin 29 has first wiring holes 45, through which off-coil wires 44 mutually connecting the connection boards 33 are pierced. By piercing the off-coil wires 44 through the first wiring holes 45, the connection boards 33 can be connected via the shortest route. Further, the bobbin 29 has wire bundling sections 47, which bundle external wires 46 connected to the connection boards 33, and second wiring holes 48, through which the external wires are pierced. The external wires 46, which are soldered to electrodes of the connection boards 33, are connected to an external wire board, not shown, via the wire bundling sections 47 and the second wiring holes 48; therefore, tensile forces working to the external wires 46 can be once received by the bobbins 29 having the second wiring holes 48, so that no tensile forces directly work to the connecting sections of the connection boards 33 and reliability of the connecting sections can be improved. The first wiring holes 45, the wire bundling sections 47 and the second wiring holes 48 are symmetrically arranged, so that the both bobbins 29 can be manufacture by the same molding die.

Figure 12:
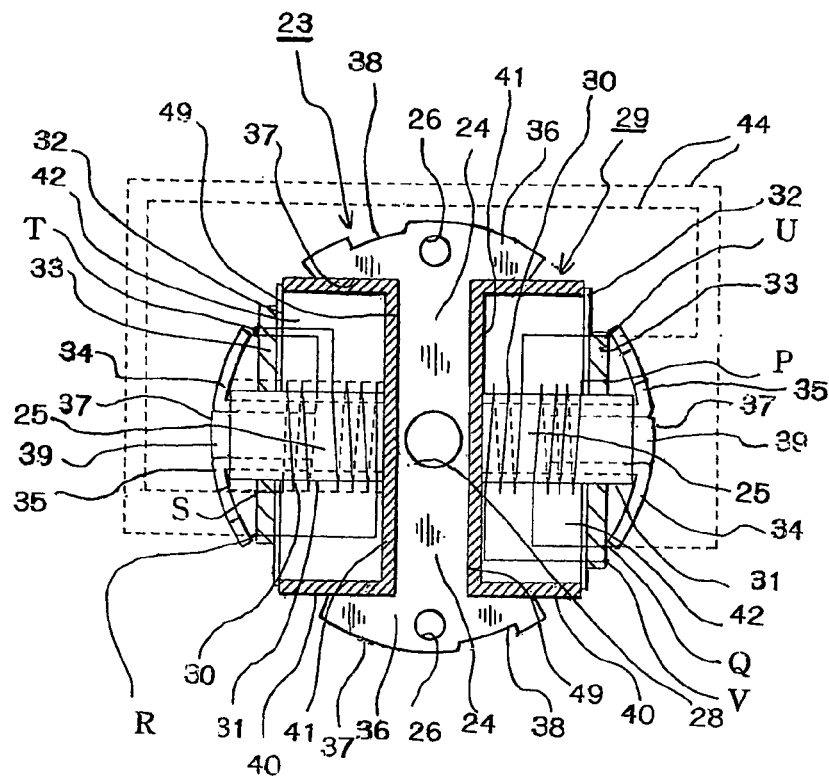
FIG. 12 is an explanation view showing wire connection between armature coils, which are wound on the bobbins and fitted in the stator core.

In FIG. 12, the second magnetic pole cores 39 are respectively pierced through the cylindrical core sections 31 of the bobbins 29, and the bridging sections 41 contact the side faces 49 of the connection body part of the first magnetic pole cores 36, so that the bobbins are set in the stator core 23. Since the second magnetic pole cores 39 are pierced through the cylindrical core sections 31 until the bridging sections 41 contact the side faces 49 of the first magnetic pole cores 36, the bobbins 29 can be easily set so that the motor can be easily automatically assembled.

The armature coils 30, in which a wire has been previously wound, are fitted in the groove sections 42 of the bobbins 29. The cylindrical core sections 31 are outwardly projected from the wall sections 40, the insulator films 32, which are fitted in the cylindrical core sections 31, cover side faces of the armature coils 30. The connection boards 33, in which cable patterns for mutually connecting electrodes of the armature coils are formed, are provided on the outer side of the insulator films 32 and fitted to the cylindrical core sections 31. The connection boards 33 are mutually electrically connected by the off-coil wires 44. As described above, the connection boards 33 are provided in vacant spaces, which are located on the outer side of the armature coils 30 fitted to the bobbins 29, so that wires in the stator 23 can be omitted and the motor can be small in size.

In the connection boards 33 shown in FIG. 12, a terminal P is a starting end of winding the armature coils 30, a terminal V is a terminating end of winding the armature coils 30, terminals Q, R, S and U are intermediate terminals connecting the armature coils 30 to the off-coil wires 44, and a terminal T is an intermediate tap. In each of the armature coils 30, a half of the coil acts as an A-coil and the other half acts as a B-coil.

Figure 13A:
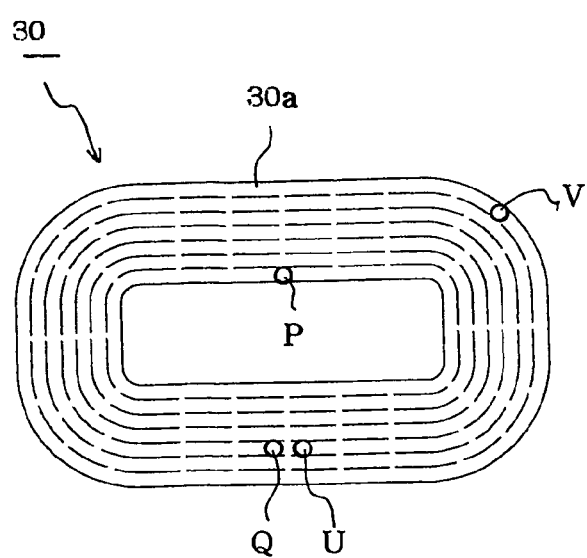
FIG. 13A is a plan view of the armature coil.
Figure 13B:
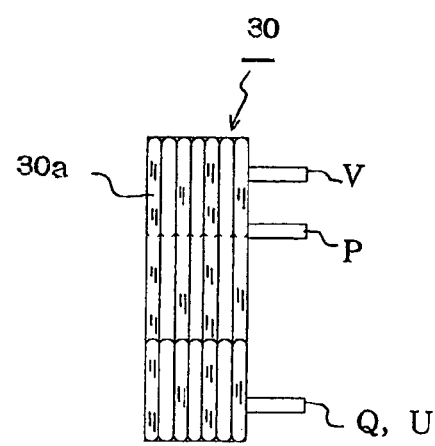
FIG. 13B is a side view thereof.

The ring-shaped armature coil 30, in which a wire 30*a* has been previously wound by a winding jig, is shown in FIGS. 13A and 13B. The shown armature coil 30 is fitted to the right side bobbin 29 shown in FIG. 12, and it is seen from outer side of the cylindrical core section 31 and wound in the counterclockwise direction. The wires extended outward correspond to the terminals Q, U and V of the connection board 33 shown in FIG. 12. Note that, the other armature coil 30, which is wound in the clockwise direction when it is seen from outer side of the cylindrical core section 31, is fitted to the cylindrical core section 31 of the left side bobbin 29.

The wire 30*a* of the armature coils 30 has been previously wound by an automatic winder with the winding jig. The armature coils 30 are fitted in the groove sections 42, which are respectively formed in the bobbins 29 to enclose the cylindrical core sections 31. Preferably, the wire 30*a* is a self-welding wire. The self-welding wire is wound around the winding jig like a coil, then the coiled self-welding wire is heated so as to self-weld the wire, or the self-welding wire is wound around the winding jig like a coil with applying alcohol so as to dissolve a welding agent. The armature coils 30, which have been manufactured by the above described methods, are fitted to the cylindrical core sections 31 of the bobbins 29, then accommodated in the groove sections 42 and fixed by an adhesive.

The armature coils 30, which have been previously formed into the ring-shapes, are fitted in the groove sections 42 enclosing the cylindrical core sections 31, so the armature coils 30, which have been formed by winding the wire 30*a*, can be manufactured without reference to flexure and deformation of the bobbins 29. Therefore, the regular winding of the wire 30*a* can be easily performed, so that space factor of the coils and efficiency of the motor can be improved.

In FIG. 3, the magnet rotor 10 stops at positions, at which magnetic resistance between the magnetic flux acting surface parts 37 of the first magnetic pole cores 36 and the second magnetic pole cores 37 (including the pole piece sections 34*a* and 35*a* of the auxiliary cores 34 and 35) and the rotor magnetic poles (the N-poles and the S-poles), namely it stops at positions M' and N' shown in FIG. 3, which are slightly shifted, in the clockwise direction, from the longitudinal center lines M and N of the first and second magnetic pole cores 36 and 39. Therefore, the rotor magnetic poles and the magnetic poles of the first and second magnetic pole cores 36 and 39 mutually repulse and attract when an electric power is applied to the armature coils 30 to start the motor, so that a starting and rotating direction of the magnet rotor 10 can be stabilized. Since the shape of each magnetic flux acting surface part 37, which is extended to the both sides of the first magnetic pole core 36, on one side of the longitudinal centerline M of the first magnetic pole cores 36 is different from that on the other side so as to be magnetically asymmetrical with respect to the longitudinal centerline M, rotational dead points of starting the motor can be disappeared, and the magnet rotor 10 can be stably started and rotated in a prescribed direction (in the present embodiment, the clockwise direction in FIG. 3).

Successively, drive control of the four-pole synchronous motor will be explained with reference to a circuit diagram of FIG. 14. The starting circuit 50 full-wave-rectifies an AC current supplied from a single phase AC power source 51 by a rectifying bridge circuit 52 and selects switching means (transistors Tr1–Tr4) to change a direction of the rectified current (arrows (1) and (2) shown in FIG. 14) according to a rotational angle of the magnet rotor 10 so as to supply the rectified current to the A-coils only, so that the magnet rotor 10 can be started as a DC brushless motor. In another case not shown in the drawings, the rectified current, which alternately runs through the A-coils and the B-coils, may be switching-controlled so as to restrain input of inverting sides with respect to non-inverting sides while the rectified current is inverted.

Figure 14:
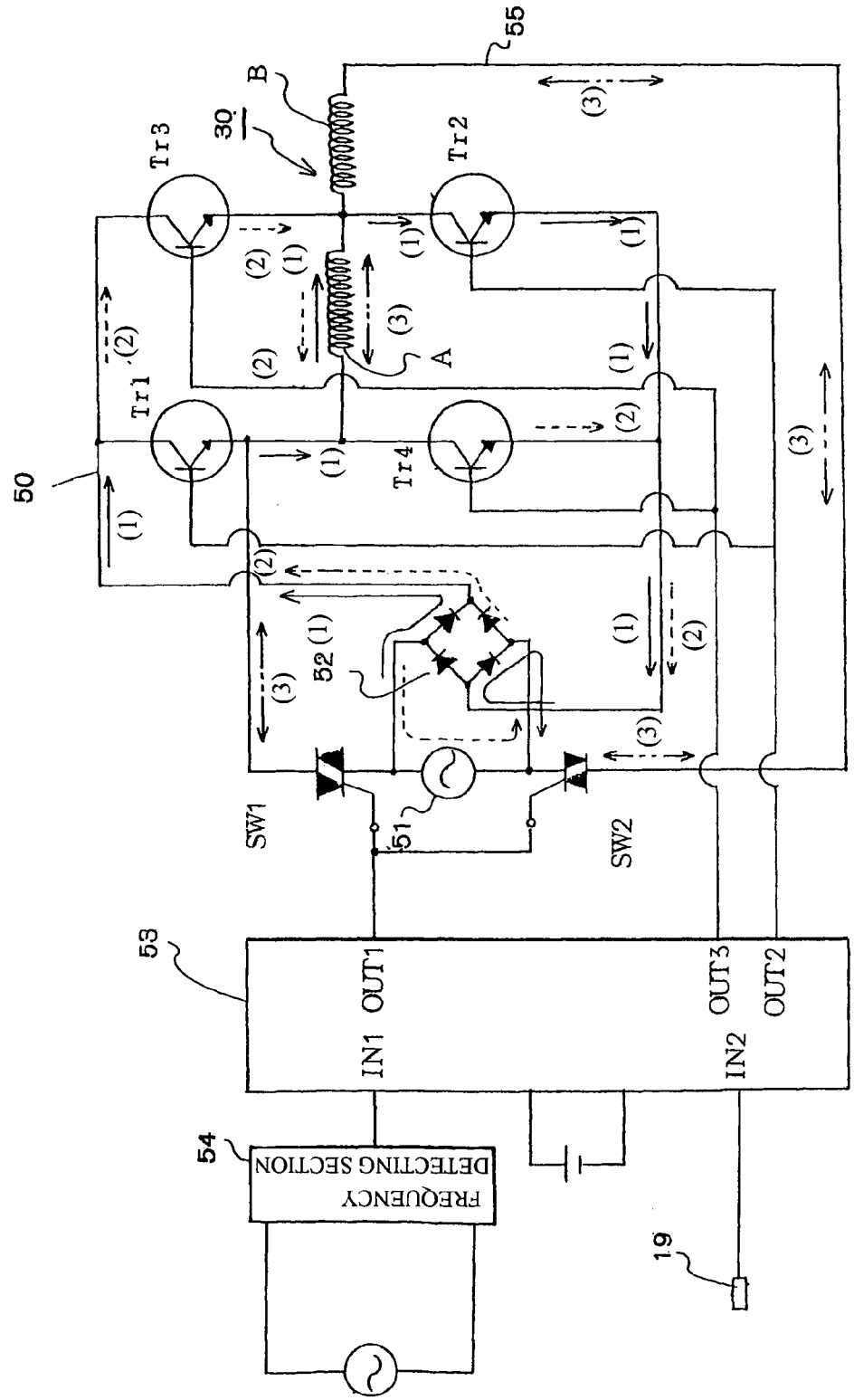
FIG. 14 is a circuit diagram of a drive circuit of the four-pole synchronous motor.

A microcomputer 53 starts the motor by alternately changing the direction of the rectified current running through the A-coils and the B-coils of the starting circuit 50, and changes the selection switches SW1 and SW2 to the synchronizing circuit 55 so as to operate as a synchronous motor with the A-coils and the B-coils (see an arrow (3) shown in FIG. 14) when revolution number of the magnet rotor 10, which is detected by the Haul element 19, reaches a prescribed number, which synchronizes with frequency detected by a power supply frequency detecting section 54.

When the synchronous motor is stepped out of synchronization by, e.g., variation of load, the microcomputer 53 once reduces the revolution number of the magnet rotor 10 from synchronous revolution number to a prescribed number and performs the starting operation again; namely, the motor can be transferred to the synchronous operation by repeating these steps.

In the four-pole synchronous motor of the present embodiment, the transference from the starting operation to the synchronous operation is controlled by the microcomputer 53, so the four-pole synchronous motor can be used without changing design even if power supply frequency is changed to 50 Hz, 60 Hz, 100 Hz, etc., therefore the highly versatile synchronous motor can be realized.

In the four-pole synchronous motor, the shape of each magnetic flux acting surface part 37 on one side of the longitudinal centerline M of the first magnetic pole cores 36 is different from that on the other side so as to be magnetically asymmetrical with respect to the longitudinal centerline M, so the rotational dead points of the magnet rotor 10 can be disappeared and the starting direction of the magnet rotor can be stabilized.

The shape of each pole piece section 34*a* or 35*a* of each auxiliary core 34 or 35, which extends the magnetic flux acting surface part 37 toward both sides, on one side of the longitudinal centerline N of the second magnetic pole cores 39 is different from that on the other side so as to be magnetically asymmetrical with respect to the longitudinal centerline N, so the starting direction of the magnet rotor can be further stabilized.

The ring-shaped armature coils 29, which are fitted in the U-shaped groove sections 42 of the bobbins 29, which are constituted by the cylindrical core sections 31, the wall sections 40 enclosing the cylindrical core sections and the bridging sections 41, and attached to the stator core 23 by piercing the second magnetic pole cores 39 through the cylindrical core sections 31 until the bridging sections 42 contact the side faces 49 of the connection body part of the first magnetic pole cores 36; therefore, manufacturing steps of the motor can be simplified, the motor can be automatically assembled, and productivity of the motor can be improved.

The armature coils 30, which have been previously wound by the winding jig, are fitted in the groove sections 42, so the armature coils 30 can be produced without reference to flexure and deformation of the bobbins 29. Therefore, space factor of the coiled wire and efficiency of the motor can be improved.

Since the connection boards 33, in which cable patterns for mutually connecting electrodes of the armature coils 30, are fitted to the cylindrical core sections 31, the coils can be mutually connected by the connections boards 33 in spaces located on outer sides of the armature coils 30, which have been fitted to the cylindrical core sections 31, so that wire length in the motor can be shortened and the motor can be small in size.

Further, the bobbins 29 have the first wiring holes 45, through which the off-connection wires 44 mutually connecting the connection boards 33 are pierced, so that the connection boards 33 can be connected via the shortest way. The bobbins have the second wiring holes 48, through which the external wires 46 connected to the connection boards 33 are bundled and pierced, so that tensile forces working to the external wires 46 can be once received by the bobbins 29 having the second wiring holes 48, no tensile forces directly work to the connecting sections of the connection boards 33, and reliability of the connecting sections can be improved.

The four-pole synchronous motor of the present invention is not limited to the above described embodiment, shapes, positions, sizes, angular ranges, etc. of the concave sections 38 of the magnetic flux acting surface parts 37 of the first magnetic pole cores 36 and the holes 35*c* of the auxiliary cores 35, which are formed to be magnetically asymmetrical, may be changed within allowable realms. The microcomputer 53 controlling the motor may be integrated with the motor, or a part of a control section (including an AC power source, a starting circuit, a synchronizing circuit, etc.) of an apparatus driven by the motor may control the motor.

To insure safety against overload, in the four-pole synchronous motor of the present invention, a thermal fuse 56 (see FIG. 11A) or a high temperature detecting switch, e.g., bimetal, may be assembled in a circuit section (e.g., the connection board 33), to which electric power is always supplied during operation, as well as conventional motors.

Further, the armature coils 30 need not be constituted by the A-coils and the B-coils, single coils, for example, may be used as the armature coils, namely the present invention can be modified without deviating the spirit of the invention.

The invention claimed is:

1. A four-pole synchronous motor comprising:
    a housing:
    an output shaft rotatably supported in the housing;
    a cylindrical magnet rotor having four magnetic poles, said magnet rotor being rotatably supported in said housing on said output shaft;
    a stator, through which the output shaft extends, provided in a space encased by said magnet rotor, said stator having a stator core on which armature coils are formed with bobbins,
    the stator core having first magnetic pole cores formed at opposing sides of a connection body part of crisscrossed connected body parts and second magnetic pole cores formed at other opposing sides of the connection body part, the first magnetic pole cores including magnetic flux acting surface parts extended at opposing sides of the first magnetic pole cores in a circumferential direction, and a shape of each of the magnetic flux acting surface parts on one side of a longitudinal centerline of the first magnetic pole cores being different from that on another side by having a concave section for partially increasing magnetic resistance on the one side, so as to be magnetically asymmetrical with respect to the longitudinal centerline, and
    the magnetic flux acting surface parts of the first magnetic pole cores and the second magnetic pole cores, which face said magnet rotor, being formed in the circumferential direction to extend an angle in a range of 50–70 degrees.

2. The four-pole synchronous motor according to claim 1, wherein said second magnetic pole cores have pole piece sections provided at opposing sides of the second magnetic pole cores as auxiliary cores so as to extend magnetic flux acting surface parts at the opposing sides of the second magnetic pole cores in the circumferential direction, and a shape of each pole piece section on one side of a longitudinal centerline of the second magnetic pole cores is made different from that on another side, by forming a hole section for partially increasing magnetic resistance on one side, so as to be magnetically asymmetrical with respect to the longitudinal centerline.

3. A four-pole synchronous motor comprising:
    a housing:
    an output shaft rotatably supported in the housing;
    a cylindrical magnet rotor having four magnetic poles, said magnet rotor being rotatably supported in said housing on said output shaft;
    armature coils on bobbins;
    a stator being provided in a space encased by said magnet rotor, said stator having a stator core, which includes first magnetic pole cores formed at opposing sides of a connection body part of crisscrossed connected body parts, through which the output shaft extends, and second magnetic pole cores formed at other opposing sides of the connection body part and on which are mounted said armature coils;
    wherein the bobbins have U-shaped groove sections each having a U-shape cross section formed by a cylindrical core section, a wall section enclosing the cylindrical core section and a bridging section connecting the cylindrical core section and the wall section, the ring-shaped armature coils are fitted in the U-shaped groove sections, the second magnetic pole cores are configured to slidably pass through the cylindrical core sections in an axial direction of the cylindrical core sections until the bridging sections contact side faces of the first magnetic pole cores of the connection body part, and the bobbins including the armature coils in a wound state are so disposed on the second magnetic pole cores with the bridging sections contacting the side faces of the first magnetic pole cores such that the bobbins are fitted in the stator core.

4. The four-pole synchronous motor according to claim 3, wherein the ring-shaped armature coils are formed of self-welding wire which is welded prior to installation of the ring-shaped armature coils in the bobbins fitted in the U-shaped groove sections of the bobbins.

5. The four-pole synchronous motor according to claim 3, wherein the armature coils are formed by winding a self-welding wire, and are fitted in the U-shaped groove sections of the bobbins and adhered therein.

6. The four-pole synchronous motor according to claim 3, wherein the cylindrical core sections are outwardly projected from the wall sections, insulator films covering side faces of the armature coils fitted in the cylindrical core sections are fitted to the cylindrical core sections, and connection boards, in which cable patterns for mutually connecting electrodes of the armature coils are formed, are provided on the outer side of the insulator films and fitted to the cylindrical core sections.

7. The four-pole synchronous motor according to claim 3, wherein the bobbins have first wiring holes, through which off-connection wires, which mutually connect connection boards in which cable patterns for mutually connecting electrodes of the armature coils are formed, are pierced, and second wiring holes, through which external wires, which are connected to the connection boards, are bundled and pierced.

8. The four-pole synchronous motor according to claim 3, wherein said second magnetic pole cores have pole piece sections fixed to opposing sides of said second magnetic pole cores once the armature coils are disposed on said second magnetic pole cores so as to retain said armature coils on said second magnetic pole cores and to function as auxiliary cores so as to extend magnetic flux acting surface parts at the opposing sides of the second magnetic pole cores in the circumferential direction.

9. The four-pole synchronous motor according to claim 8, wherein a shape of each pole piece section on one side of a longitudinal centerline of the second magnetic pole cores is made different from that on another side, by forming a hole section for partially increasing magnetic resistance on one side, so as to be magnetically asymmetrical with respect to the longitudinal centerline.

10. A four-pole synchronous motor comprising:
    a housing:
    an output shaft rotatably supported in the housing;

a cylindrical magnet rotor having four magnetic poles, said magnet rotor being rotatably supported in said housing on said output shaft;

a stator, through which the output shaft extends, provided in a space encased by said magnet rotor, said stator having a stator core on which armature coils are formed with bobbins;

the stator core having first magnetic pole cores formed at opposing sides of a connection body part of crisscrossed connected body parts and second magnetic pole cores formed at other opposing sides of the connection body part, the first magnetic pole cores including magnetic flux acting surface parts extended at opposing sides of the first magnetic pole cores in a circumferential direction, and a shape of each of the magnetic flux acting surface parts on one side of a longitudinal centerline of the first magnetic pole cores being different from that on another side by having a concave section for partially increasing magnetic resistance on the one side, so as to be magnetically asymmetrical with respect to the longitudinal centerline; and said second magnetic pole cores having pole piece sections provided at opposing sides of the second magnetic pole cores as auxiliary cores so as to extend magnetic flux acting surface parts at the opposing sides of the second magnetic pole cores in the circumferential direction, and a shape of each pole piece section on one side of a longitudinal centerline of the second magnetic pole cores being made different from that on another side, by forming a hole section for partially increasing magnetic resistance on one side, so as to be magnetically asymmetrical with respect to the longitudinal centerline.

* * * * *